No. 855,169. PATENTED MAY 28, 1907.
E. GESCHKE.
ROLLER BEARING.
APPLICATION FILED DEC. 20, 1906.
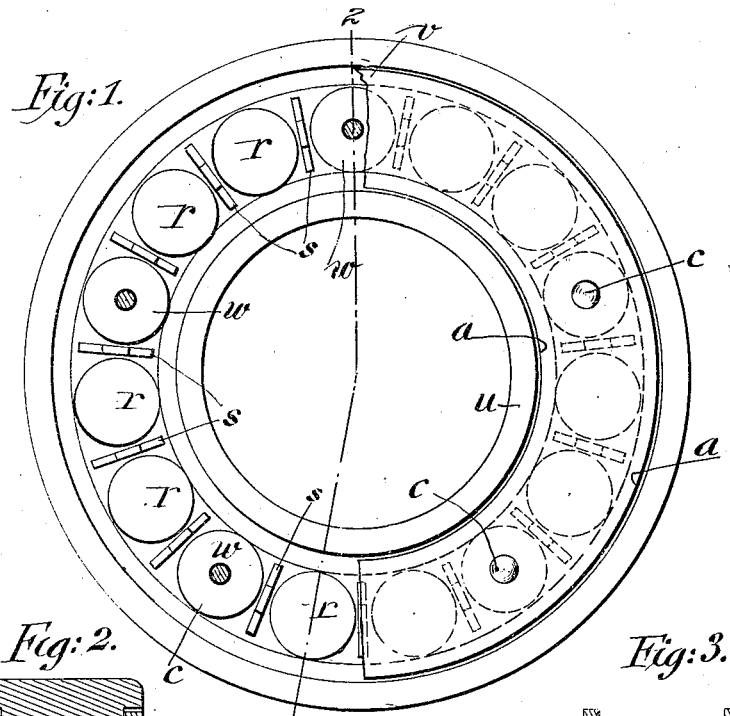
Fig. 1.
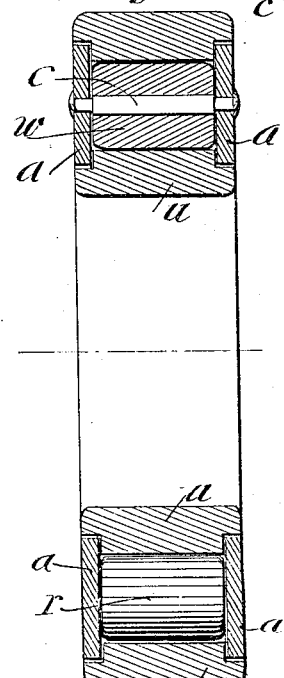
Fig. 2.
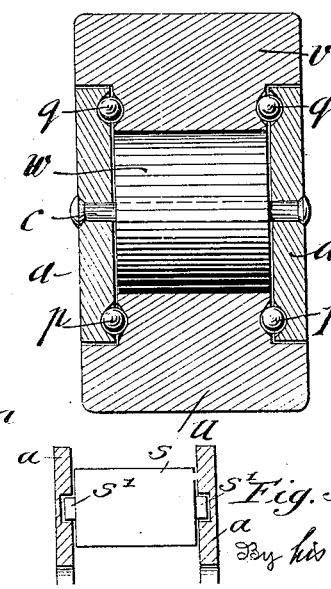
Fig. 4.
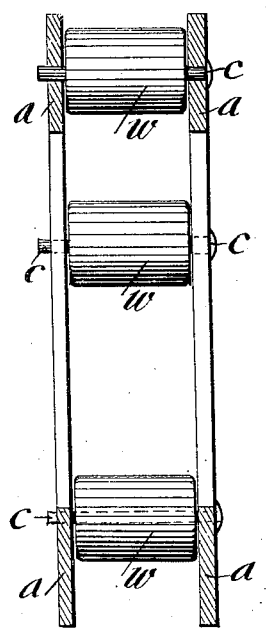
Fig. 3.
Fig. 5.
Witnesses
Inventor
Ernst Geschke
By his Attorneys

UNITED STATES PATENT OFFICE.

ERNST GESCHKE, OF CHARLOTTENBURG, GERMANY, ASSIGNOR TO THE FIRM OF DEUTSCHE WAFFEN & MUNITIONSFABRIKEN, OF BERLIN, GERMANY.

ROLLER-BEARING.

No. 855,169.  Specification of Letters Patent.  Patented May 28, 1907.

Application filed December 20, 1906. Serial No. 348,690.

*To all whom it may concern:*

Be it known that I, ERNST GESCHKE, a citizen of the Empire of Germany, residing in Charlottenburg, in the Empire of Germany, have invented certain new and useful Improvements in Roller-Bearings, of which the following is a specification.

This invention relates to roller-bearings, and the object of the invention is to provide such a bearing in which the rollers are mounted and arranged in an improved manner between the relatively movable surfaces of the bearing.

With this end in view, the invention consists in a roller-bearing which comprises the novel features of construction and combinations of parts to be hereinafter described and claimed.

In the accompanying drawings, in which similar reference characters indicate corresponding parts throughout the views, Figure 1 is an elevation of a roller-bearing constructed in accordance with the invention, said bearing being shown as partially broken away, Fig. 2 is a section on line 2, 2, Fig. 1, Fig. 3 is a section through the roller-carrying cage, Fig. 4 shows in section a modified arrangement of the bearing, and Fig. 5 is a detail showing the manner in which the distance-pieces are secured between the side-rings of the cage.

In the drawings $u$ denotes an inner ring and $v$ an outer ring, one of which is intended to be stationary and the other rotatable. These rings are concentric with each other and lie in the same plane, as shown in Fig. 2. They are provided upon their outer edges with recesses in which are set annular plates or rings $a$ by which said rings are spaced apart at a uniform distance throughout their circumferences. The annular plates $a$ are connected at equidistantly spaced points by means of pins $c$, the outer ends of which are upset, as shown in Fig. 2, whereby the rings $a$ form in conjunction with said pins $a$ cage which is interposed between the bearing-rings.

Mounted upon the pins $c$ of the cage are rollers $w$ which rotate in contact with the opposing surfaces of the bearing-rings. In the space between each two adjacent rollers $w$ there are arranged a number of loose, freely rotatable rollers $r$. Between the adjacent rollers there are arranged distance-pieces $s$ in the form of radially-arranged plates which permit the rollers $r$ to have a certain play, but do not contact with the rollers $w$. Said distance-pieces are secured between the annular plates $a$ by means of lugs $s^1$ formed at the ends of said distance-pieces and engaging corresponding recesses in the inner surfaces of said annular plates, as shown in Fig. 5. When the cage is formed the distance-pieces are interposed between the annular side-plates and said plates are then connected by the pins $c$ as before described. In addition to their function of separating the rollers of the bearing, the distance-pieces $s$ cause the annular side-plates to be spaced apart uniformly throughout their circumferences and impart great rigidity to the ball-carrying cage.

The side-plates $a$ rotate freely in the corresponding grooves of the bearing-rings and by such engagement with the grooves the lateral movement of said plates and the rollers is prevented. By the arrangement of the side-plates $a$ the access of dust and the like to the rollers and bearing surfaces is prevented.

As before stated, the rollers $w$ do not contact with the distance-pieces and the friction between said distance-pieces and the free rollers $r$ is very slight.

In the form shown in Fig. 4, antifriction-balls are interposed between the opposing surfaces of the side-plates $a$ and of the bearing-rings $u$, $v$. In said figure $p$ denotes the balls which are interposed between the ring $u$ and the plates $a$, and $q$ those which are interposed between said plates and the outer bearing-ring $v$. This construction is used where the bearing is subjected to greater strain than that for which the first-described form is adapted.

Having thus described my invention, I claim as new and desire to secure by Letters Patent:

In a roller-bearing, the combination, with inner and outer bearing-rings having grooves at the sides thereof, of a roller-cage comprising annular side-plates which fit in said grooves, distance-pieces secured between said side-plates, pins connecting said side-plates, rollers mounted on said pins between certain of said distance-pieces and traveling in contact with said bearing-rings, and free unmounted rollers travelling in contact with the bearing-rings between the other distance-pieces.

In testimony, that I claim the foregoing as my invention, I have signed my name in presence of two subscribing witnesses.

ERNST GESCHKE.

Witnesses:
 HENRY HASPER,
 WOLDEMAR HAUPT.